US010153691B2

(12) United States Patent
Keszthelyi et al.

(10) Patent No.: US 10,153,691 B2
(45) Date of Patent: Dec. 11, 2018

(54) PHOTOVOLTAIC PANEL POWER OUTPUT BOOSTER AND METHOD

(71) Applicants: Laszlo Keszthelyi, Douglaston, NY (US); Frank Sulak, Fallbrook, CA (US); Rudolf Sulák, Székesfehérvár (HU)

(72) Inventors: Laszlo Keszthelyi, Douglaston, NY (US); Frank Sulak, Fallbrook, CA (US); Rudolf Sulák, Székesfehérvár (HU)

( * ) Notice: Subject to any disclaimer, the term of this patent is extended or adjusted under 35 U.S.C. 154(b) by 0 days.

(21) Appl. No.: 15/732,226

(22) Filed: Oct. 7, 2017

(65) Prior Publication Data
US 2018/0145627 A1 May 24, 2018

Related U.S. Application Data

(60) Provisional application No. 62/496,237, filed on Oct. 7, 2016.

(51) Int. Cl.
H02M 3/07 (2006.01)
H02S 40/30 (2014.01)
H02S 50/00 (2014.01)

(52) U.S. Cl.
CPC ............. H02M 3/07 (2013.01); H02S 40/30 (2014.12); H02S 50/00 (2013.01)

(58) Field of Classification Search
CPC ................... H02M 3/155–3/1588; H02M 3/07
See application file for complete search history.

(56) References Cited

U.S. PATENT DOCUMENTS

| 5,801,519 A * | 9/1998 | Midya ....................... G05F 1/67 323/222 |
| 6,058,035 A * | 5/2000 | Madenokouji ............ G05F 1/67 363/95 |
| 8,754,627 B1* | 6/2014 | Le ............................. G05F 1/67 323/299 |
| 2006/0017492 A1* | 1/2006 | Scratchley .............. H02M 3/07 327/538 |
| 2008/0003462 A1* | 1/2008 | Aleyraz ............ H01M 8/04559 429/431 |
| 2009/0121549 A1* | 5/2009 | Leonard ................. H02M 3/156 307/51 |
| 2009/0261789 A1* | 10/2009 | Chang ................... H02M 5/458 323/234 |
| 2010/0133911 A1* | 6/2010 | Williams .................. G05F 1/67 307/82 |
| 2012/0187768 A1* | 7/2012 | Goder ....................... H02J 1/10 307/82 |
| 2013/0155736 A1* | 6/2013 | Ilic .......................... H02M 7/72 363/71 |

(Continued)

Primary Examiner — Yusef A Ahmed

(57) ABSTRACT

A booster for PHOTOVOLTAIC (PV) panel output power utilizes the low output voltage generated by the PV panel during none optimum operating conditions, to enhance the power output level of PV panel. The booster module described, in the exemplary embodiments of the present invention, operates only on energy provided by the PV panel that is connected to, and does not require any other source of energy. Booster operation is implemented such that, when booster is disabled, during normal PV panel output levels (50% to 100% of a PV panel rating), it does not adversely affect the PV panel efficiency.

2 Claims, 6 Drawing Sheets

PV PANEL OUTPUT POWER BOOSTER BLOCK DIAGRAM

(56) References Cited

U.S. PATENT DOCUMENTS

| | | | | |
|---|---|---|---|---|
| 2013/0155739 A1* | 6/2013 | Itako | G05F 1/67 | 363/95 |
| 2014/0054969 A1* | 2/2014 | Beijer | G05F 1/67 | 307/78 |
| 2014/0152107 A1* | 6/2014 | Shimada | G05F 1/67 | 307/52 |
| 2014/0211530 A1* | 7/2014 | Chen | H02M 7/53871 | 363/132 |
| 2015/0263621 A1* | 9/2015 | Yu | G05F 1/67 | 323/271 |
| 2015/0270787 A1* | 9/2015 | Fujisaki | H02M 1/08 | 363/41 |
| 2015/0280487 A1* | 10/2015 | Nakazawa | H01M 10/44 | 320/101 |
| 2015/0288291 A1* | 10/2015 | Han | H02M 3/337 | 363/17 |
| 2015/0372615 A1* | 12/2015 | Ayyanar | H02M 1/15 | 363/131 |
| 2016/0164440 A1* | 6/2016 | Kataoka | G05F 1/67 | 318/400.3 |
| 2017/0054364 A1* | 2/2017 | Ferdowsi | H02M 3/158 | |
| 2017/0366010 A1* | 12/2017 | Chen | H02J 3/383 | |
| 2018/0027630 A1* | 1/2018 | DeJonge | H05B 33/0815 | 315/86 |
| 2018/0102646 A1* | 4/2018 | Apte | H02J 1/14 | |

\* cited by examiner

| Vin (volts) From PV panel | Vout (volts) Into 500 Ohm load | |
|---|---|---|
| 1.0 | 0.47 | |
| 1.5 | 0.95 | |
| 2.0 | 4.04 | Doubler has started |
| 2.5 | 5.03 | |
| 3.0 | 6.06 | |
| 3.5 | 7.08 | |
| 4.0 | 7.95 | |
| 4.5 | 9.09 | |
| 5.0 | 10.38 | |
| 5.5 | 11.36 | |
| 6.0 | 12.41 | |

FIG.5 Low voltage doubler-stage data.

| Without Booster | | | With Booster | | |
|---|---|---|---|---|---|
| I | V | W | I | V | W |
| (Amp) | (Volt) | (Watt) | (Amp) | (Volt) | (Watt) |
| 1.89 | 16.74 | 31.60 | 1.90 | 17.00 | 32.4 |
| 1.79 | 15.08 | 27.00 | 1.83 | 15.65 | 28.5 |
| 1.28 | 8.17 | 10.20 | 1.36 | 9.33 | 12.5 |
| 0.81 | 3.45 | 2.50 | 1.02 | 5.85 | 5.8 |
| 0.70 | 2.60 | 1.90 | 1.00 | 5.37 | 4.8 |
| 0.55 | 1.62 | 0.80 | 0.78 | 3.98 | 3.1 |

FIG.6  PV panel measured output.

PHOTOVOLTAIC PANEL POWER OUTPUT BOOSTER AND METHOD

CROSS-REFERENCE TO RELATED APPLICATIONS

This application claims the benefit of U.S. provisional application No. 62/496,237 entitled: PHOTOVOLTAIC PANEL POWER OUTPUT BOOSTER AND METHOD filed Oct. 7, 2016.

BACKGROUND OF THE INVENTION

1. Field of the Invention

The exemplary embodiments of the present invention relates to generation of electrical energy from light energy through the use of Photovoltaic Panel (PV panel). It should be noted for sake of brevity the phrase "PV" is used for photovoltaic. Use of PV panels is gaining increased popularity due to improvement in performance efficiency, and large scale production of PV panels at an ever decreasing cost.

BRIEF SUMMARY OF THE INVENTION

An output power booster technology is proposed in exemplary embodiments of the present invention to increase output power generated in Photovoltaic panel.

BRIEF DESCRIPTION OF THE DRAWINGS AND EXPERIMENTAL DATA

FIG. 5 is a sample of collected data of a charge-pump capacitive voltage doubler driven by a photovoltaic panel according to exemplary embodiments of the present invention;

FIG. 6 is a sample of collected data showing the effect of injected high frequency booster bias pulses into the photovoltaic panel output terminal according to exemplary embodiments of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims. Broadly, an embodiment of the present invention generally provides a power booster device and a method for boosting the power output of a photovoltaic panel, during the morning and afternoon hours, when in the normal operating mode the photovoltaic panel output is below 50% of a PV panel output power rating.

Figure 1:
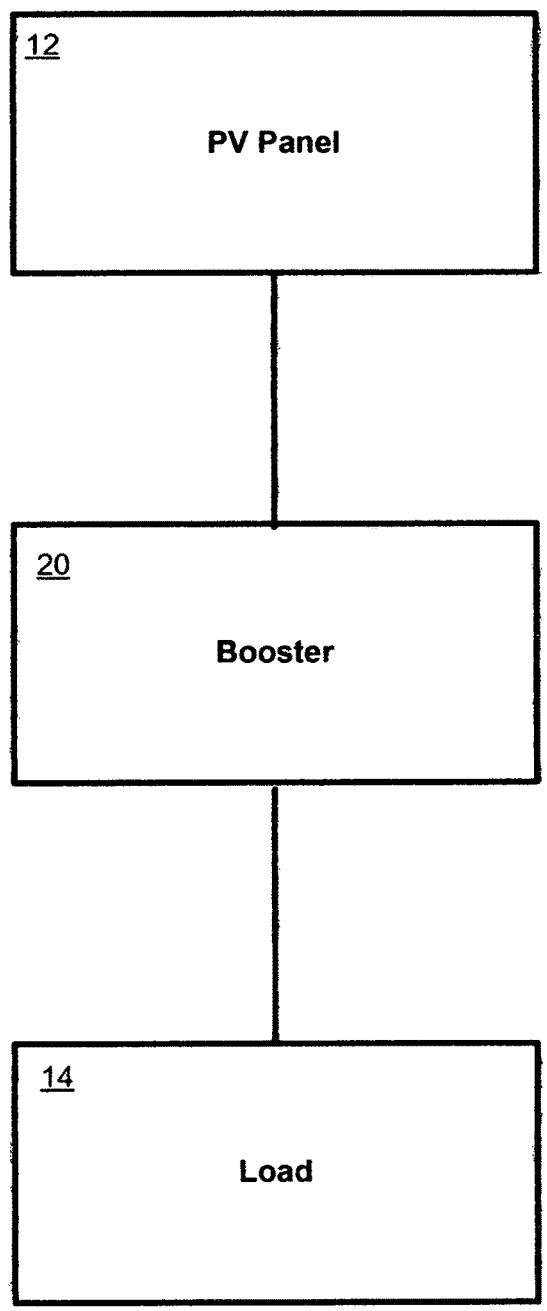
FIG. 1 is a block diagram of a typical environment of a power booster for a photovoltaic panel according to exemplary embodiments of the present invention.

FIG. 1 shows a simplified block diagram of a typical environment of a power booster for a photovoltaic panel 12. The environment of a power booster 10 may include one or more PV panels 12. The PV panel 12 may be coupled to the power booster device 20. The power booster device 20 is used for interacting with the PV panel 12. The environment of a power booster 10 may also include a load 14. Load 14 may be coupled to PV panel 12 via booster 20.

Figure 2:
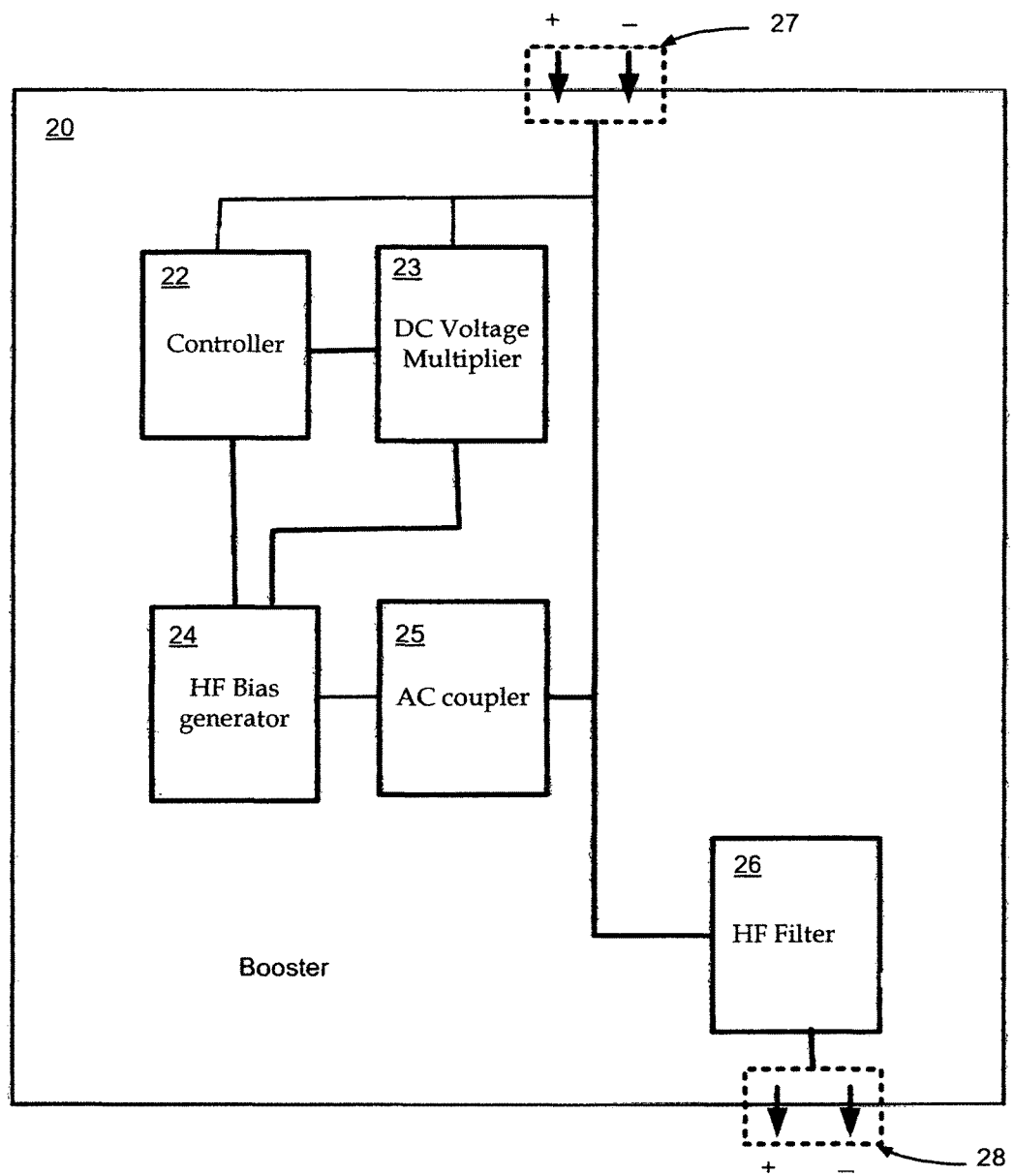
FIG. 2 is a block diagram of a power booster for according to exemplary embodiments of the present invention.

FIG. 2 shows a block diagram of the of power booster device 20. Power booster device 20 is for determining if the PV panel 12 is receiving enough light from the Sun for generating electrical energy to the load 14 and when needed try to boost the output power PV panel 12. For this operation, the power booster device 20 does not require auxiliary power source. Booster generates its own power requirements by using the PV panel 12 provided low output voltage and processing it through a chain of series/parallel connected charge-pump capacitive voltage doubler devices. The output stage of the voltage multiplier circuits stores the this built energy in a low Equivalent Series Resistance (ESR) capacitor bank at a controlled level and supplies the boosters' other circuits with the required input power.

Power booster device 20 includes a DC voltage multiplier 23. The DC voltage multiplier 23 receives input power from the PV panel 12 via input terminal 27. A low level input stage of a voltage doubler/multiplier chain may power up itself when a PV panel output voltage reaches a 2 volt DC level. FIG. 5 displays test data collected from a low level voltage doubler driven by the PV panel 12. Integrated circuit charge-pump capacitive voltage doubler for low power applications are well known in the electronic industry. When requirements exceed voltage/current capabilities of integrated circuits, charge-pump capacitive voltage doubler circuits are constructed in a combined integrated circuit/discrete component form. The DC voltage multiplier 23 is coupled to a Controller 22 and to a High Frequency bias generator 24. The Controller 22 monitors the DC voltage built up and stored in the capacitor bank of the DC voltage multiplier 23. The controller 22 determines if there is enough voltage for boosting operation or there is enough energy for regular operation (without boost) of PV panel 12. Other functions of the controller module 22 is to control the HF bias generator, enable/disable DC voltage multiplier and HF bias generator subassemblies for a boost or non-boost mode of operation of the booster module 22. Controller 22 is coupled to a high frequency (HF) bias generator 24. The HF bias generator 24 is turned-on when power boost is needed. The HF bias generator subassembly utilizes stored energy of the DC voltage multiplier capacitor bank and when a boost command is present, from the controller subassembly, it will generate a preselected pulse train for the boosting operation. Output of the HF bias generator 24 is coupled to input terminal 27, via an AC coupler 25, to inject a high frequency bias to the PV panel 12 via input terminal 27. High frequency pulses may induce bias in crystal structure of the semiconductor layers of the PV panel 12. The induced bias may increase the electron mobility in the semiconductor layer of PV panel 12. FIG. 6 shows the effect of booster signal injected into the PV panel 12 via input terminal 27 at several operating levels. The DC output of the PV panel 12 may be outputted to the load 14 through an HF filter 26.

The power booster device 20 is implemented such that it has minimal effect on the efficiency of a PV panel 12 when the booster 20 is inactive.

Figure 3:
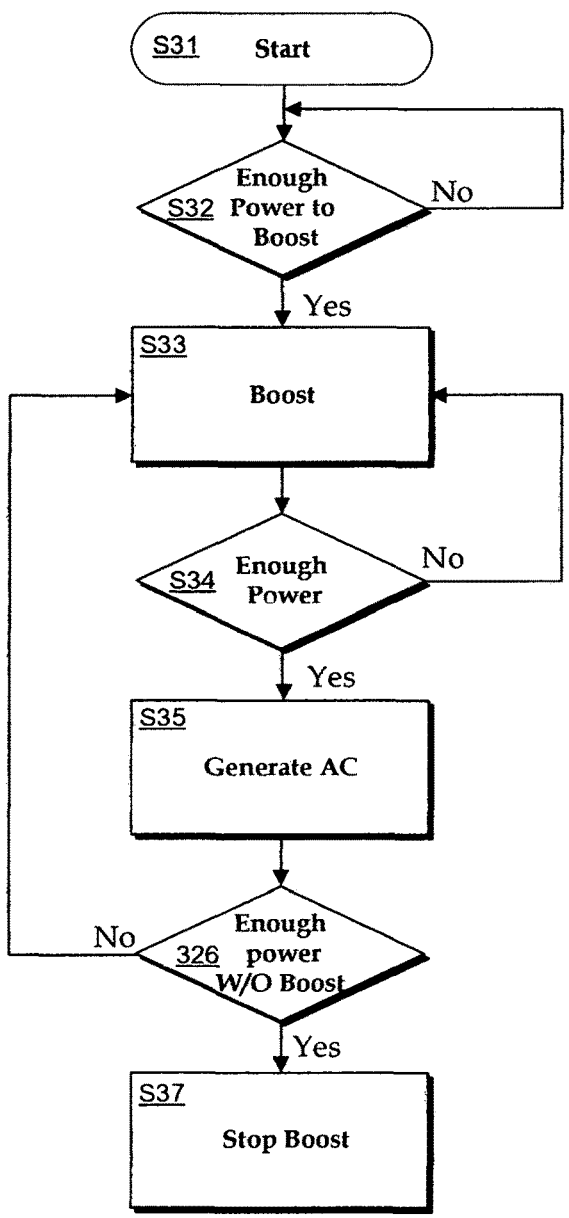
FIG. 3 is a flowchart of a method for boosting the power output of the photovoltaic panel according to exemplary embodiments of the present invention.

FIG. 3 shows a flowchart, illustrating a method 30 for boosting the power output of the PV panel 12. Method 30 may start at step S31. In step S32 it is determined if there is enough power to boost, if not the process loops back to step S32, otherwise in step S33 boost is started. In step S34 it is determined if there is enough power from the PV panel 12, if not the process loops back to step S33 to continue boosting, otherwise in step S35 AC generation is started. In step S36 it is determined if there is enough power from the PV panel 12 without boost, if not the process loops back to step S33, otherwise in step S37 the boost is stopped.

Figure 4:
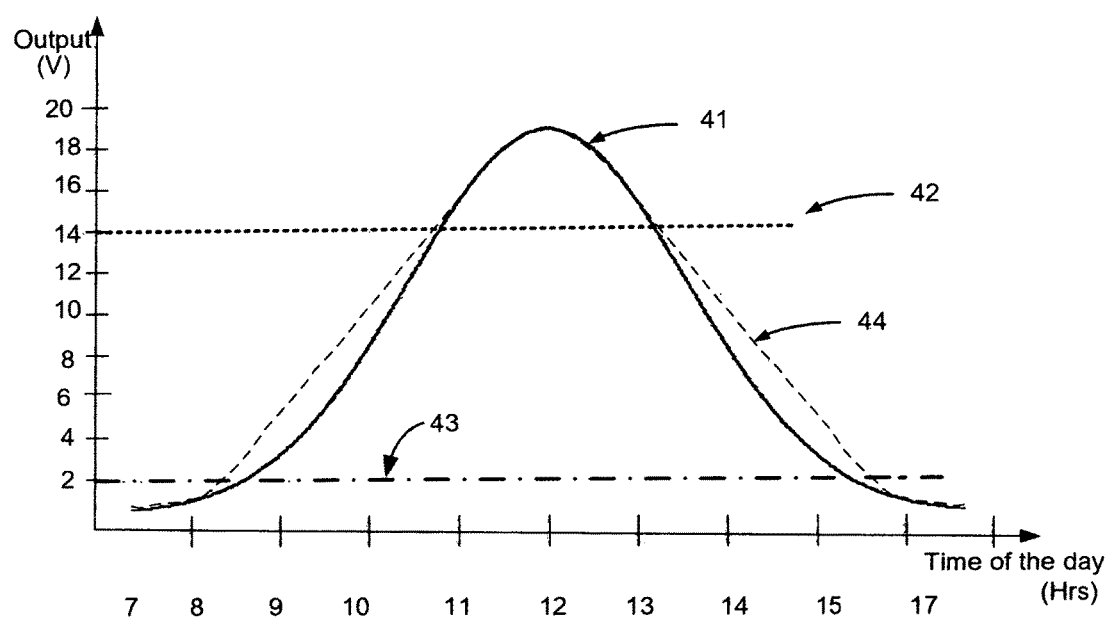
FIG. 4 is a diagram illustrating the power output enhancement of the photovoltaic panel according to exemplary embodiments of the present invention.

FIG. 4 is a graph illustrating an exemplary power output gain of the photovoltaic panel by employing a power booster device. Bell shape curve 41 represents the possible output voltage of an un-boosted PV panel. Bell shape curve 44 represents a typical output voltage of a boosted PV panel. Line 42 shows a voltage level above which no boost is needed. Line 43 shows a voltage level above which boost may provide power output gain.

It should be understood, of course, that the foregoing relates to exemplary embodiments of the invention and that modifications may be made, for higher power PV panels, without departing from the spirit and scope of the invention as set forth in the following claims.

We claim:

1. A method for boosting power output of at least one Photovoltaic (PV) panel, comprising:
   a) a booster module that includes a DC voltage multiplier circuitry which monitors an output of the at least one PV panel, multiplies PV panel low level DC output voltage of the monitored PV panel and stores built up energy in a capacitor bank;
   b) wherein a controller circuitry of the booster module monitors the level of the stored energy of the capacitor bank and when a capacitor bank voltage level reached a first preset value for the monitored PV panel, the controller circuitry activates a high frequency bias generator circuitry of the booster module;
   c) wherein the DC voltage multiplier circuitry provides power supply function to the controller circuitry and to the high frequency bias generator circuitry of the booster module;
   d) wherein when the controller circuitry is active, the controller circuitry determines if power from the monitored PV panel matches a second preset value for energy production, and sets up a go condition for power boosting;
   e) wherein when the controller circuitry provides the go condition, the high frequency bias generator circuitry produces bias pulses for reinjection onto monitored PV panel output lines, thus starting boost of output power;
   f) wherein when the controller circuitry determines that the output power produced by the monitored PV panel is more than 50% of the rated power for the monitored PV panel, the controller circuitry generates a stop boosting command; and
   g) wherein when the controller circuitry generates the stop boosting command, the controller circuitry disables the generation of the bias pulses until a new go condition is generated.

2. A power booster device for boosting power output of a Photovoltaic (PV) panel comprises a booster module, comprising:
   a) a DC voltage multiplier subassembly coupled to an input terminal of the booster module; the DC voltage multiplier subassembly utilizes a PV panel supplied low output voltage to store built up energy in a low Equivalent Series Resistance (ESR) capacitor bank at a controlled level;
   b) a high frequency bias generator subassembly receives power from the DC voltage multiplier subassembly and outputs pulse trains through an AC coupler subassembly;
   c) a controller subassembly receiving power from the DC voltage multiplier subassembly and supplies control functions to the DC voltage multiplier and to the high frequency bias generator subassemblies;
   d) the AC coupler subassembly is connected to the input terminal and allows reinjection of high frequency bias pulses into a PV panel output line during boosting and presents an open circuit load to the PV panel output line when the boosting operation is disabled; and
   e) a high frequency filter assembly connected to an output terminal of the booster module to assure that the high frequency bias pulses are eliminated from the output terminal of the booster module.

* * * * *